US008437873B2

(12) United States Patent
North

(10) Patent No.: US 8,437,873 B2
(45) Date of Patent: May 7, 2013

(54) AUTOMATED BIKE PARKING SYSTEM

(76) Inventor: Perry North, New York, NY (US)

( * ) Notice: Subject to any disclaimer, the term of this patent is extended or adjusted under 35 U.S.C. 154(b) by 567 days.

(21) Appl. No.: 12/701,239

(22) Filed: Feb. 5, 2010

(65) Prior Publication Data
US 2010/0204823 A1 Aug. 12, 2010

Related U.S. Application Data

(60) Provisional application No. 61/150,782, filed on Feb. 8, 2009, provisional application No. 61/261,410, filed on Nov. 16, 2009.

(51) Int. Cl.
G06F 7/00 (2006.01)
G06F 17/00 (2006.01)

(52) U.S. Cl.
USPC ............. 700/215; 52/79.4; 340/432; 340/427

(58) Field of Classification Search ................... 700/215
See application file for complete search history.

(56) References Cited

U.S. PATENT DOCUMENTS

| 502,431 | A | | 6/1991 | Schwarze | |
|---|---|---|---|---|---|
| 526,566 | A | | 11/1993 | Lester | |
| 5,278,538 | A | * | 1/1994 | Ainsworth et al. | 340/427 |
| 564,195 | A | | 6/1997 | Cai | |
| 584,578 | A | | 8/1998 | Robolin | |
| 584,135 | A | | 11/1998 | Rey | |
| 5,845,788 | A | * | 12/1998 | Robolin | 211/17 |
| 6,164,459 | A | * | 12/2000 | Liem | 211/5 |
| 637,171 | A1 | | 4/2002 | Grams | |
| 6,637,602 | B2 | * | 10/2003 | Dueck | 211/17 |
| 672,947 | A1 | | 5/2004 | Boers | |
| 6,823,236 | B2 | * | 11/2004 | Speckhart et al. | 700/215 |
| 713,374 | A1 | | 11/2006 | Stenson | |
| 2007/0065259 | A1 | | 3/2007 | Talley | |
| 2007/0107322 | A1 | * | 5/2007 | Blume | 52/79.4 |
| 2008/0042811 | A1 | * | 2/2008 | Le Gars | 340/432 |

FOREIGN PATENT DOCUMENTS

| EP | 0 677 628 | 5/1998 |
|---|---|---|
| EP | 1 122 194 | 11/2004 |
| EP | 1 031 679 | 12/2005 |
| WO | WO 02/067210 | 8/2002 |

* cited by examiner

Primary Examiner — Gene Crawford
Assistant Examiner — Kyle Logan
(74) Attorney, Agent, or Firm — Jennifer Meredith, Esq.; Meredith & Keyhani, PLLC

(57) ABSTRACT

System, device and method for providing public, high-density bicycle storage and protection from elements and theft. System includes overhead conveyors from which bicycles are hung in a near side/far side arrangement where handlebars of only every other bicycle are aligned. Bicycles are rolled into a loading station on their back wheels by user and secured, from the front wheel, to a hook that is removably coupled to a load hoist. Access to loading station is controlled by an access control panel. Load hoist lifts the hook to place the bicycle in a hanging position. Robotic arm of a robotic elevator grasps, retracts and lowers (or raises) the bicycle into a multilevel storage area and onto overhead conveyors. Users may be bike-share users or storage users who store the particular bicycle they own.

24 Claims, 21 Drawing Sheets

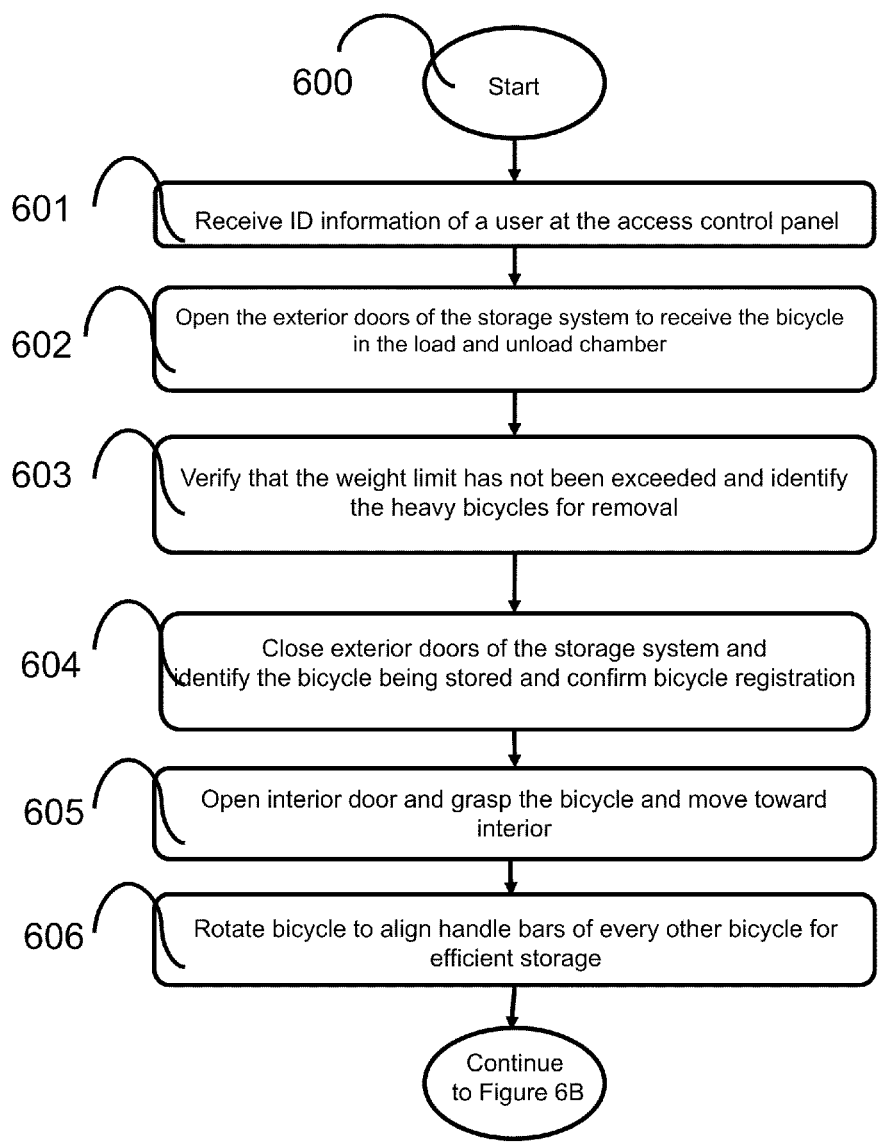

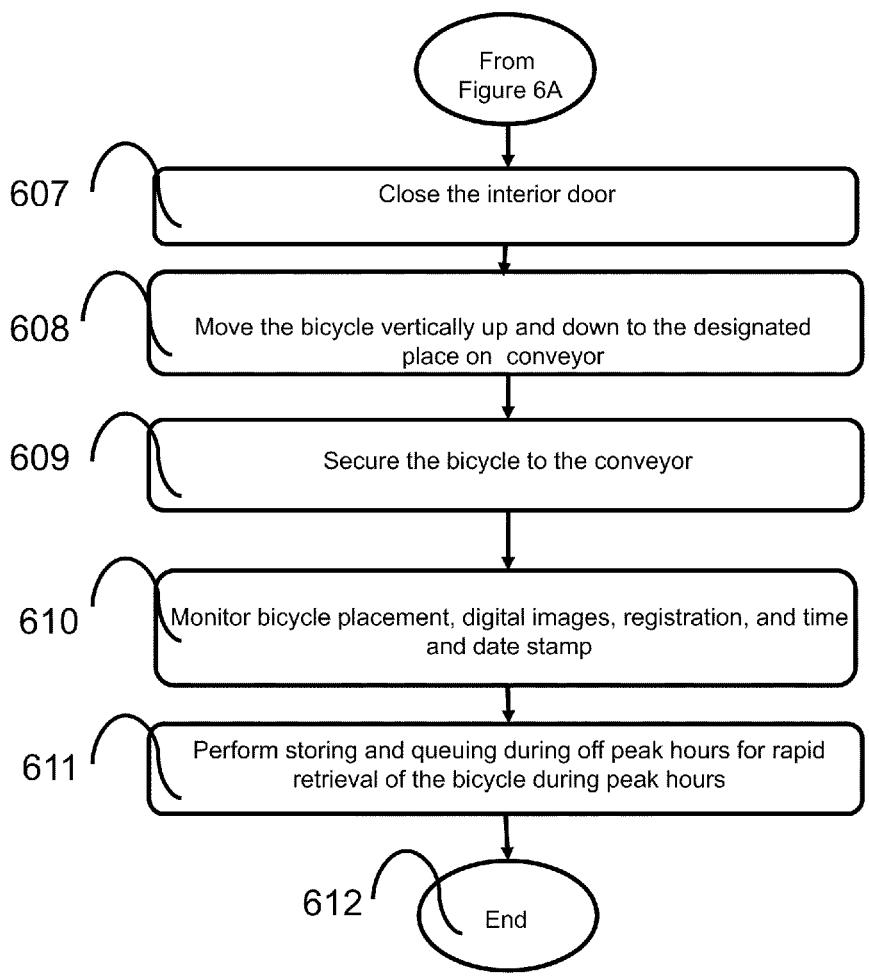

Figure 7A
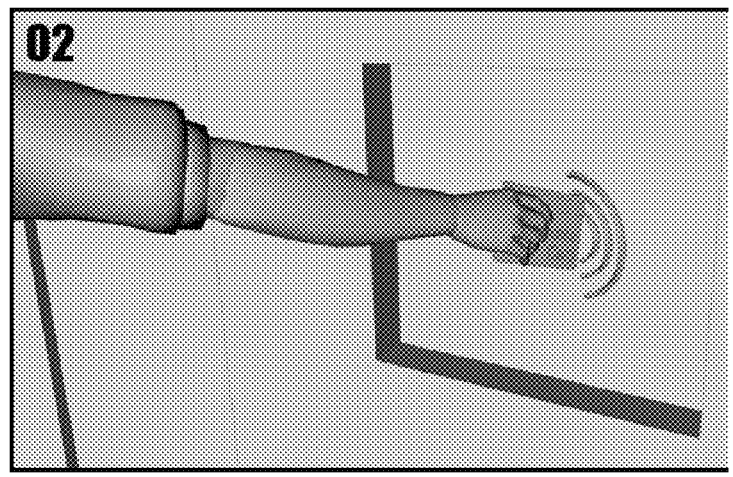
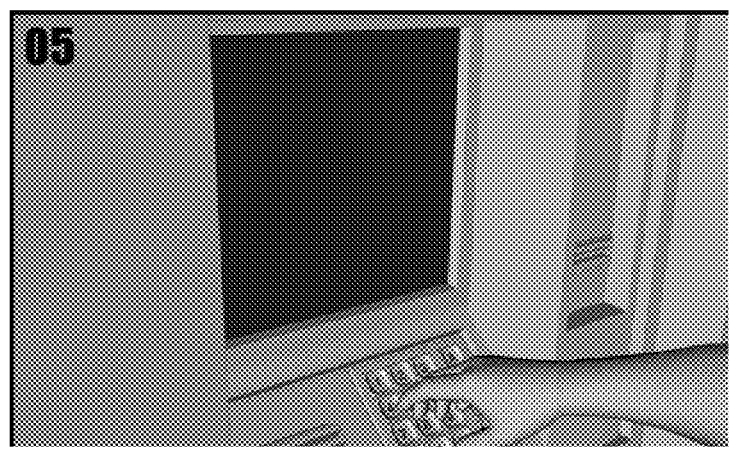

Figure 7B
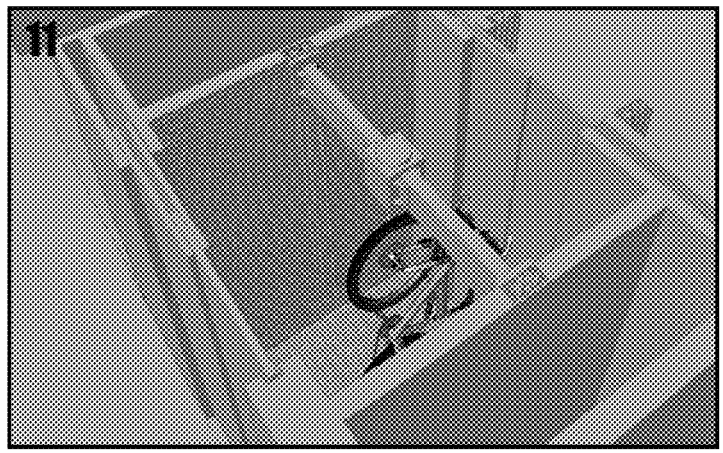
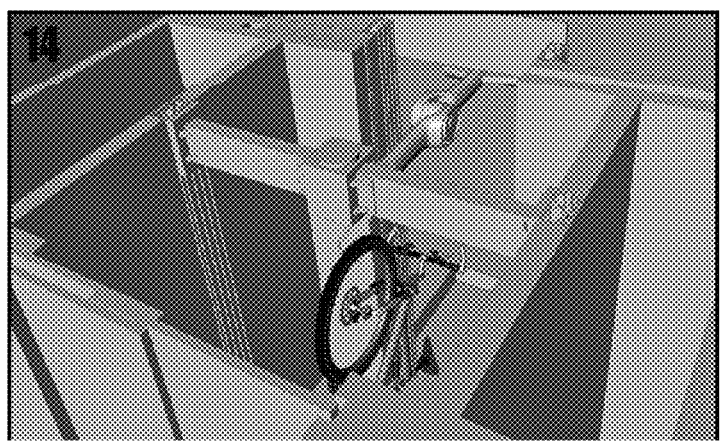

AUTOMATED BIKE PARKING SYSTEM

CROSS-REFERENCE TO RELATED APPLICATIONS

The present application claims priority to and the benefit of the U.S. Provisional Patent Application No. 61/150,782, filed in the United States Patent and Trademark Office on Feb. 8, 2009, and Provisional Patent Application No. 61/261,410, filed in the United States Patent and Trademark Office on Nov. 16, 2009, the entire contents of both are incorporated by this reference.

BACKGROUND OF THE INVENTION

1. Field of the Invention

The present invention pertains generally to the field of bicycle storage and, more particularly, to automated and high-density bicycle storage.

2. Description of Related Art

Bike racks are used to store bicycles and bike sheds are used to both store a bicycle and protect it from the elements. Various types of bike racks allow for storage of a bicycle on the side of a street or building or on the roof or back of a car. Bike sheds cover and protect the bike from the rain and the wind and they keep the bike out of view of thieves.

With less expensive bikes and older bikes, chaining or locking the bike to the open bike racks was generally sufficient to thwart the stealing of the bike. The bike was one device with all the parts permanently connected together. Dismantling the bike would entail damaging it and would diminish the value. The newer and more expensive bicycles of today include several parts that are assembled by the user and can be taken apart quite easily. For example, both the front and the back wheels separate from the remainder of the bicycle frame. Open bike racks are generally quite inadequate for protecting such bikes. If the bike is chained to a rack, the chain has to pass through and connect all the separable parts of the bike before connecting to the rack.

Most bike sheds are used for personal storage of the bicycle at the owner's property. The shed, in such situations is used primarily to protect the bike from the elements. Some public storage racks include a cover that is molded roughly in the shape of a bike and can cover the entire bike like a lid. A lock provided by the bicycle owner subsequently locks the cover to a hook in the ground. Such covers are bulky and take up a large amount of space. Accordingly, they are not well suited to small areas where high-density storage of bicycles is required.

BRIEF SUMMARY OF THE INVENTION

The bicycle racks and sheds of the prior art do not provide an automatic system and method for storing the bike in a public place that would protect the bike from being stolen and from the elements and is adapted to being implemented in a crowded area where a large number of bikes need to be stored with a rapid turnaround time. With the systems of prior art, the owner has to carry his own lock and has to manually place the lock on the chain or the bar that locks the bike to the rack or on a door or lid of a shed. A thief needs to get through only the lock in order to reach the bicycle. Moreover, bike racks do not protect against the elements and most conventional bike sheds do not withstand severe storms. Further, the arrangement of the racks, and particularly sheds, on one level limits the total number of bikes that can be stored. Finally, bike racks and bike sheds provide personal access to the owner of the bike and are not suitable for bike share programs where the same bike will be used by multiple users and must be accessible to them. Therefore, most conventional racks and sheds are not appropriate for providing storage and security to bike riders in crowded city centers such as Copenhagen, Amsterdam and other European cities where bicycle is one of the main means of transportation and bike share programs are offered to tourists and the local population.

Aspects of the present invention provide a device, a system and a method of storing bicycles that overcome the above issues of the currently available storage systems and methods.

Aspects of the present invention provide a system, device and method for providing public, high-density bicycle storage and protection from both the elements and theft. The system includes overhead conveyors from which the bicycles are hung from their front wheel in a near side/far side arrangement where the handlebars of every other bicycle are aligned. The bicycles are rolled into a loading station on their back wheels by the user and secured, from the front wheel, to a hook that is connected to a load hoist. The hook may be removed from the load hoist and remains with the bicycle during the period of storage. In this manner, the hook is being handled by various machinery of the system and the bicycle is protected from potential damage. Access to the loading station is controlled by an access control panel. The load hoist lifts the hook to place the bicycle in a hanging and suspended position. Once suspended, the bicycle is electronically scanned for various types of information including size and information that may be read from a bar code or the like. Further, each bicycle may be digitally photographed and registered. The system also includes a robotic elevator, which lowers or raises, the bicycle from the loading station into a multilevel storage area. A robotic arm of the robotic elevator pulls the bicycle to remove it from the loading station into the storage area and onto the overhead conveyors. Customers and users may be bike-share users who can have access to a number of bicycles or storage users who store the particular bicycle that they own and retrieve the same bicycle from the system.

Aspects of the present invention provide a system for public storage of bicycles. The system includes a control access panel for authorizing a user to access the system, a loading station for receiving a bicycle from the user, a robotic elevator for lowering or raising the bicycle to a storage area, a conveyor for receiving the bicycle from the robotic elevator, and computer controls for identifying and registering the bicycle and the user.

Aspects of the present invention provide an automatic method for public storage of bicycles at a public storage system. The public storage system has a loading station for receiving the bicycles, a robotic elevator for raising or lowering the bicycles to a storage area and for placing the bicycles on conveyors in the storage area and computer controls for identifying, scanning and registering the bicycle. The method includes receiving identification information of a user at an access control panel for providing access to the loading station, providing access to the loading station by opening an exterior door of the loading station, closing the exterior door after receiving of a bicycle from the user, identifying the bicycle by reading and processing identification insignia of the bicycle, opening an interior door providing a passage between the loading station and the storage area, grasping the bicycle by a robotic arm of the robotic elevator, rotating the bicycle toward an interior of the system in toward the storage area, lifting or lowering the bicycle to a designated place on the conveyors, securing the bicycle to the conveyors in the storage area, retracting the robotic arm, and closing the interior door once the bicycle and robotic arm are clear.

The conveyor is configured in a serpentine shape, at each level of storage, and the robotic elevator is located with respect to the conveyor to provide multiple points of access to the robotic elevator for efficient transfer of the bicycle between the robotic arm and the conveyor.

In one aspect of the present invention, once within the storage area, a robotic arm of the robotic elevator has equidistant access to three different points along the serpentine conveyor belt. In one configuration, the points of access are 120 degrees apart around a circular area. The circular area is formed by the robotic arm pivoting 360 degrees centered at a joint that connects the arm to the elevator and about a vertical access. Radius of the circular area would depend on the degree to which the arm needs to be extended to reach the conveyor belt at the three points that are equidistant from the center of the circle.

In Various aspects of the present invention, a robotic elevator is arranged near the loading station such that a robotic arm of the robotic elevator may extend into the loading station and extract the bicycle. In one aspect, the robotic elevator includes several components that are attached together to form the robotic arm, which is capable of extending or retracting and rotating to various degrees about various axes.

The components of the robotic arm operate together such that the bicycle maintains the position it first assumes in the loading station after being suspended. The robotic arm may rotate about an axis in the horizontal plane, but the bicycle, being carried by the robotic arm, retains the same perpendicular position to the horizontal plane that it assumed when suspended in the loading station. As such, the bicycle is not being swung back and forth causing stress on the wheel structure or the remainder of the bike.

In one aspect, the robotic arm includes three components that to some degree mimic the hand, the forearm and the upper arm of a human arm. An upper component of the robotic arm is coupled to the remainder of the robotic elevator at a joint similar to a human shoulder and arm joint. An end component of the robotic arm grabs a hook carrying the bicycle with the component that mimics the hand and is coupled to a middle component via a joint that is to some level similar to a wrist joint. The middle component and the upper component are coupled together via a joint that to some degree mimics the elbow joint of a person. The likening of the robotic arm to a human arm is approximate.

In one aspect, the motion of the robotic arm is similar to a human arm reaching into a coat closet, grabbing a coat hanger, pulling back the elbow to the side of the body with the forearm remaining parallel to the floor. At this point, when a live person is removing a coat from a coat closet, he usually turns his entire body and, if the coat is long, he may re-extend his arm to the front so that the long coat does not collect dust from the floor and then moves away from the closet. The robotic arm may be designed to mimic these same movements of the human arm. However, unlike a person, the robotic arm has no front or back. The robotic arm may, instead, extend backwards as if the person kept facing the closet looking for more items but extended his arm back handing the coat to someone behind him without turning around.

In some aspects of the present invention, the robotic elevator may include one rail along which the robotic arm may move up and down. Using one rail permits the robotic arm to operate more as a human arm removing a coat hanger from a closet. The arm may rotate about the rail after clearing the loading station. Alternatively, the robotic elevator may include two rails between which the robotic arm moves up and down. In this situation, usually the robotic arm has to retract and extend backwards if the second rail is too close and will not clear a rotation by the extended or even retracting arm that has a bicycle hanging at the end.

BRIEF DESCRIPTION OF THE DRAWINGS

FIG. 6A and FIG. 6B show a flowchart of an exemplary method of operation, according to aspects of the present invention.

FIG. 7A depicts a user accessing a loading station according to the present invention.

FIG. 7B depicts an alternative embodiment in which the conveyor belts are shown wit empty hooks hanging.

DETAILED DESCRIPTION OF THE INVENTION

Aspects of the present invention provide a device, a system and a method for safely and efficiently storing bicycles. Using the systems and methods of the aspects of the present invention, a large number of bicycles may be stored in a small space while, at the same time, access to each bicycle is secured to its owner or authorized users alone. The bicycles are protected from theft as well as the elements. Both storage and retrieval of the bicycle are performed during a short cycle period to save the time of the users whether they are standing in line to store their bicycle or have provided their information to the system and are waiting to retrieve their bicycle.

In one aspect of the present invention a fully automated storage system is provided that may operate on a 24/7 basis. Components of the system include an access control panel, a loading station, a robotic elevator and overhead conveyors. Computer controls and associated software are used for identification of the customer and users as well as the bicycles. With multiple storage locations connected in a network, public use of the system begins at the access control panel. Security cards and personal identification numbers (PINs) confirm identity of the user and other data that may be usable by a public bicycle parking system or a bike share rental. Bikes are manually rolled into the loading station on their rear wheels where the handling of the bikes is performed via a hook that hangs the bike from the front wheel or the back wheel. The robotic elevator grasps the hook from the loading station and transfers the hook, with the attached bike, to the overhead conveyors. The system may be configured into a variety of existing spaces. The robotic elevator can park bikes from the street level to multi-level conveyors above or below the street level, from a basement up to a second floor, or even to the cavernous overhead spaces found in most transit hubs.

Figure 1:
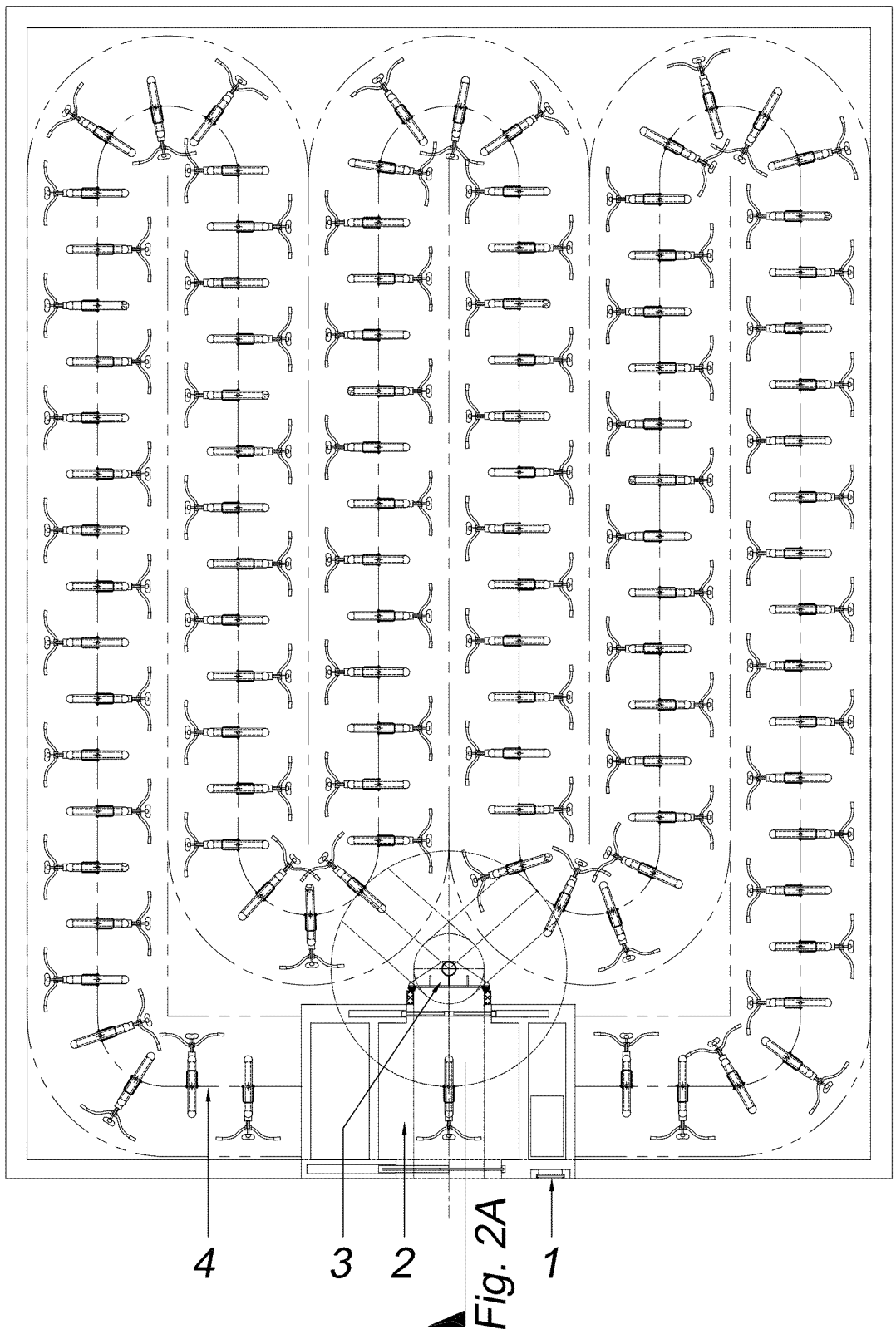
FIG. 1 shows a plan view of one type of a conveyorized bicycle parking system, according to aspects of the present invention.

FIG. 1 shows a plan view of one type of a conveyorized bike parking system, according to aspects of the present invention.

The system includes an access control panel 1, a loading station 2, a robotic elevator 3, and overhead conveyors 4. The parts of the system work together to provide an automated and smart storage function.

The access control panel 1 determines if a potential user is authorized to store or retrieve a bicycle in the storage system and determines the particular bicycle allotted to the user whether the user is a bicycle owner or someone registered to share the bicycles that are stored in the system.

The loading station 2 receives the bicycle from the user, or provides the bicycle to a user who has come to collect his bike after storage. The bicycle is coupled to a hook by its front or back wheel. The loading station includes a hoist that hangs the bicycle by lifting the hook to which the bicycle is attached.

An arm of the robotic elevator 3 can grasp the hook and move the bicycle up or down through one or more levels of storage toward a storage area. The robotic elevator 3 provides the bike to the overhead conveyors 4 which carry the hanging bicycle around the storage area.

As shown in the plan view of the overhead conveyors in FIG. 1, these conveyors are configured in a folding s, or serpentine, shape with the folds being such that the handlebars of the bikes in one row of bikes face the handlebars or the front wheels of the bikes in the adjacent row. When the bikes along a row are arranged such that the handlebars of every other bike are aligned and the front wheels of the bikes in between are parallel, as the conveyor moves in a serpentine or snake motion to bring a bike to the loading station or carry a bike from the loading station, the handlebars of one row of bikes pass across the front wheels of an adjacent row.

In alternative configurations, the bicycles may be suspended from their back wheels or from another part. Such configurations are not shown.

The access control panel provided by the aspects of the present invention allows for secure, tamper proof and weather protected access control. An enclosure may be used that has a retractable exterior closure panel. Radio frequency identification (RFID) tags embedded into the access cards may be used to interface with the controls signaling the exterior closure panel to open as the user approached the access control panel. Cameras may be used to provide for security at the sidewalk and will capture images of all users as they key in their PIN. The added security acts as a deterrent and a first line of defense against theft.

The access cards may be obtained through on-line subscription to a daily, monthly or annual service or at point of sale stations adjacent the bike share or storage locations. Access cards store personal data of the user and physical characteristics of both the user and the bike allowing for public use of the system for bike share rentals as well as public parking. The information stored on the access cards may also be used for automatic billing. The data stored on the access cards may include customer ID with PIN verification, physical size, weight and gender of the user, bike share rental sizing, public bike parking confirmation, account billing and point of sale purchases. Publicly parked bikes may include RFID and barcode tags for the second line of defense. These forms of identification allow for confirmation as bikes are scanned for storage and retrieval.

Figure 2A:
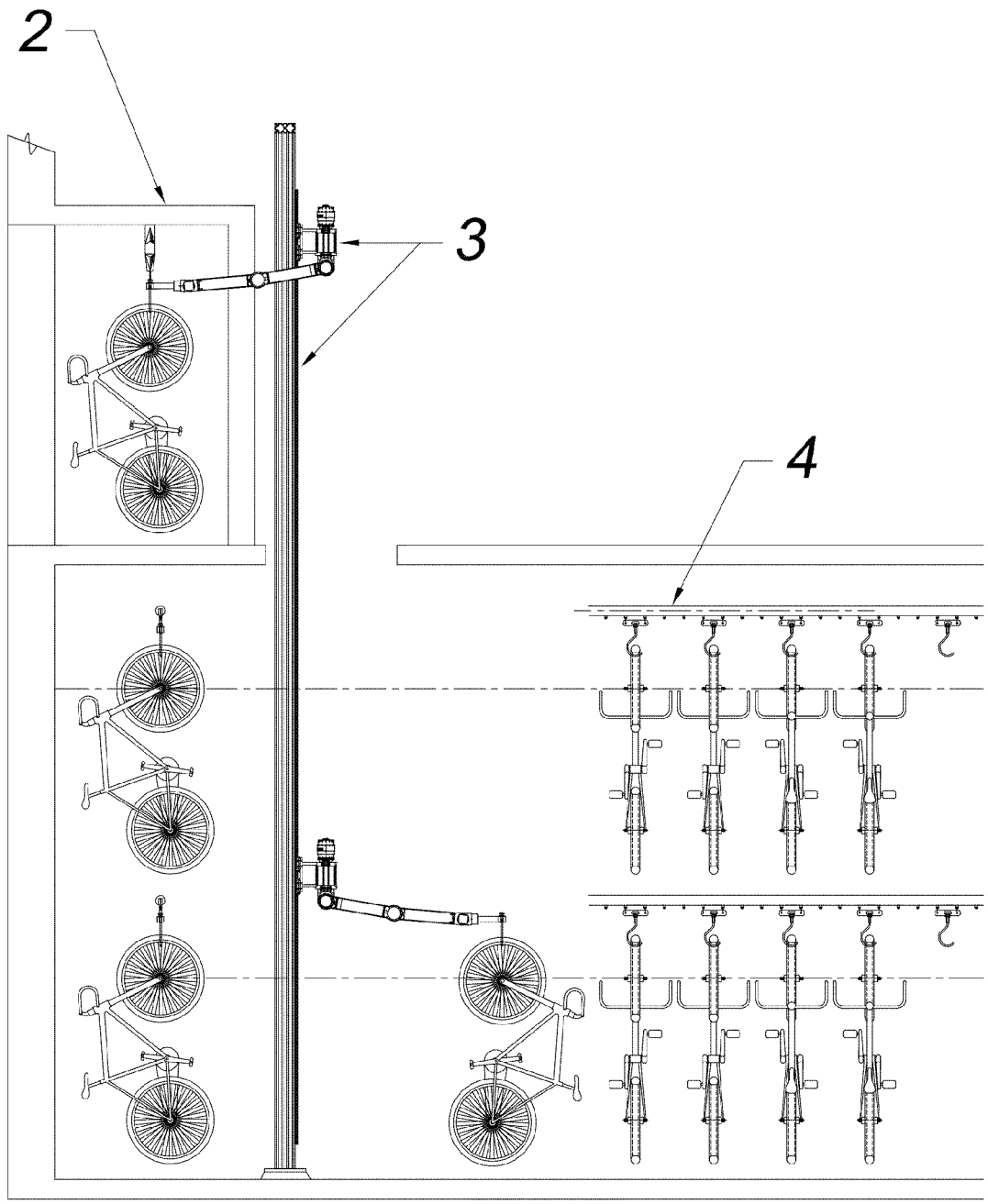
FIG. 2A shows a partial side view of FIG. 1 taken through a cross-section near the center of a loading station, according to aspects of the present invention.

FIG. 2A shows a partial side view of FIG. 1 taken through a cross-section near the center of a loading station, according to aspects of the present invention.

The side view shows the loading station 2, the robotic elevator 3, and the overhead conveyors 4.

As seen in FIG. 2A, the robotic elevator 3 carries the bike in a hanging configuration. A robotic arm lifts the bicycle and this same robotic arm may retract or rotate to remove the bicycle from the chamber of the loading station 2 and onto the overhead conveyors 4. The robotic arm is part of the robotic elevator 3.

The robotic elevator 3 includes a chamber of its own within which the bicycle is raised or lowered. This elevator chamber may be a continuation of the loading chamber 2. In one alternative, the floor or the roof of the loading chamber 2 are retractable such that the bicycle may be lowered or raised, by the robotic arm of the robotic elevator, along the same profile that it is placed in the loading chamber. Once the bicycle reaches the storage level, the robotic arm rotates to place the bicycle on the conveyor. Having a floor that opens and closes may pose safety considerations in case the system malfunctions. In another alternative, the elevator chamber is located adjacent the loading chamber. In this alternative, the robotic arm retracts or rotates the bicycle into the elevator chamber, through a side door in the loading chamber, before raising or lowering the bicycle to the appropriate storage level. The elevator chamber may be an open area, partially located within the storage area, along which the robotic arm may carry the bicycle up and down without interfering with other bicycles that may be hanging from the conveyor belt. The elevator chamber may be located on any of the three remaining sides of the loading station according to availability of space. Further, the configuration of the conveyor belts in the storage space determines one or more optimal locations for the elevator chamber that optimize access of the elevator arm to the conveyor belt.

Figure 2B:
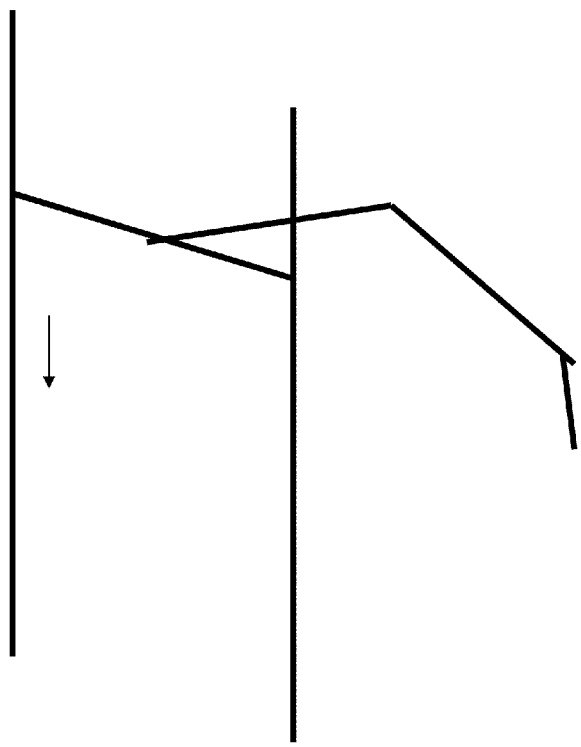
FIG. 2B, FIG. 2C, and FIG. 2D show additional views of a robotic elevator shown in FIG. 2A.
Figure 2C:
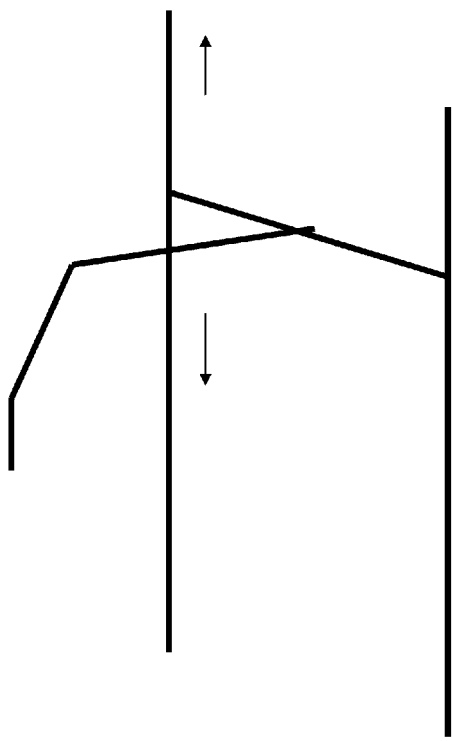
Figure 2D:
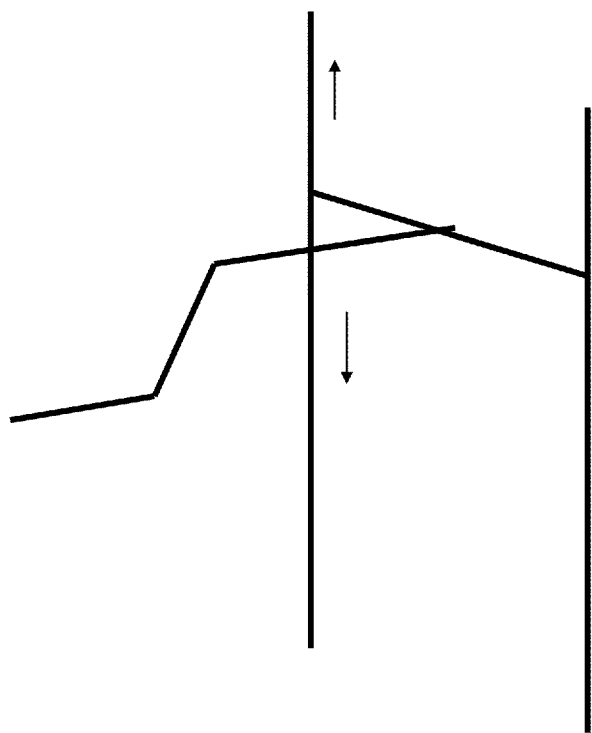

FIG. 2B, FIG. 2C, and FIG. 2D show additional views of a robotic elevator shown in FIG. 2A.

In these drawings, the robotic elevator is shown in perspective view to demonstrate the maneuverability of the robotic arm.

Figure 3:
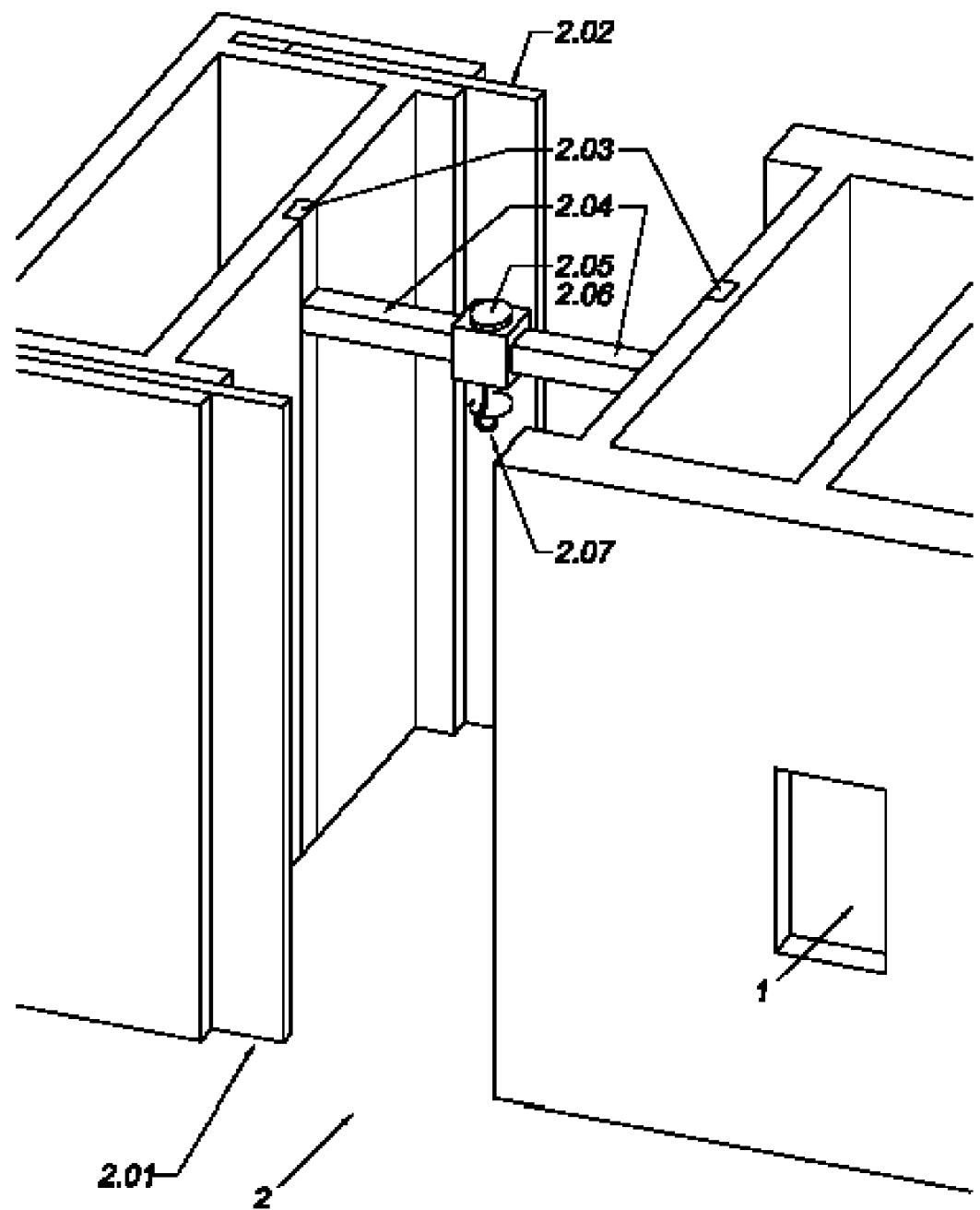
FIG. 3 shows an exemplary loading station, according to aspects of the present invention.

FIG. 3 shows an exemplary loading station, according to aspects of the present invention.

One exemplary configuration of the loading station 2 of FIG. 1 and FIG. 2A is shown in FIG. 3. The loading station includes the access control panel 1, an exterior door 2.01, an interior door 2.02, a loader hoist 2.03, a header 2.04, an indexing turntable 2.05, a load cell 2.06 and a hook 2.07.

The control panel 1 is used to read the identifying device of the user, such as a card. The exterior door 2.01 provides an opening to the outside, for example, the street surface and allows the user to roll his bike in and hang the bike on the hook 2.07. The interior door 2.02 opens to the internal storage area where the overhead conveyors 4 are located. The bike is passed through this interior door automatically by the robotic arm of the robotic elevator 3. The hook 2.07 is mounted on a turntable 2.05, which is attached to the header 2.04. The header 2.04 can move up and down with the load cell 2.06 by the loader hoist 2.03. The movement of the header 2.04 lifts the bike from the floor of the loading station to a hanging position. The hanging of the bike permits the bike to be weighed and otherwise measured. The suspended position of the bike also makes its transfer to the robotic arm easier.

The loading station provided by the aspects of the present invention loads the bike following the confirmation of the customer ID and PIN number. To load the bike, exterior door of the loading station opens. Data from the access card may be used to position a cross bar and hook of the loading station at the correct elevation that relates to the overall length of the bike. The user rolls the bike on its rear wheels into the loading station and sweeps the front wheel over the hook. Sensing the front wheel, the cross bar will move slowly upward until the bike is lifted off the ground and is suspended on the hook. At this point, additional data is read from the RFID and bar code tags of the bike and the length and weight of the bike are confirmed. Then, the outer or exterior door closes. As a third line of defense against and for added security, the space inside the loading station is screened to prevent any attempts by a person to hide within the loading station. The bike is digitally photographed on two sides as it rotates for placement. An additional series of measures are undertaken to assure that a bike entering the storage system is safe for storage. Then, the inner door opens in preparation for the robotic arm of the robotic elevator. To accommodate high-density storage, bikes are rotated 180 degrees to alternately hang the bikes with their handlebars along the near side and the far side as the conveyor approaches.

Figure 4:
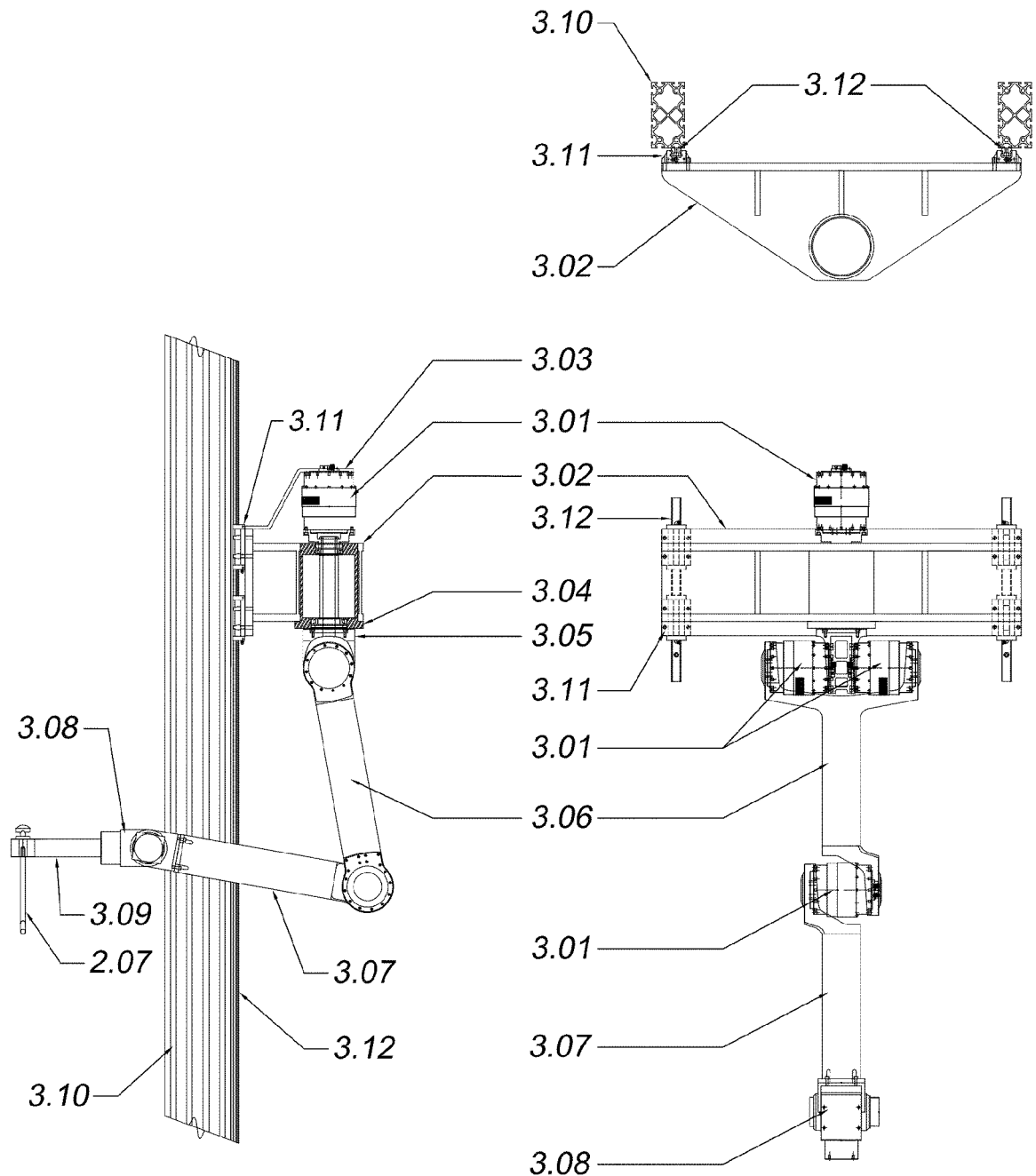
FIG. 4 shows a robotic elevator, according to aspects of the present invention.

FIG. 4 shows a robotic elevator, according to aspects of the present invention.

One exemplary configuration of the robotic elevator 3 of FIG. 1 and FIG. 2A is shown in FIG. 4. The robotic elevator includes a DC gear-motor 3.01, a carriage 3.02, a torque arm 3.03, a spindle 3.04, a piggyback mount 3.05, an upper adapter arm 3.06, a lower adapter arm 3.07, a multi axis wrist element 3.08, a gripper 3.09, an extruded aluminum profile 3.10, a linear bearing 3.11, and a linear bearing rail 3.12.

The hook 2.07, where the bicycle would be hanging, is coupled to the wrist element 3.08 through the gripper 3.09. The wrist element 3.08 is capable of rotating about the multiple axes of the wrist element and further about an axis connecting the lower adapter arm 3.07 to the upper adapter arm 3.06. The upper adapter arm can move up and down when the bearing 3.11 moves in the bearing rail 3.12. The upper adapter arm may also rotate about an axis parallel to the linear bearing rail 3.12. As such, the hook 2.07 can move up and down and in and out of the plane of the paper by the robotic elevator assembly. The robotic elevator provided by the aspects of the present invention allows for dense storage of bikes in a small space and creates the capability to reach overhead conveyors at various levels. In one alternative, the robotic arm of the robotic elevator is powered by DC electricity as is the entire system. In one aspect, the handling of the bike is performed via the hook and there is no physical contact with the bike to prevent potential damage to the bike. Using the hook facilitates the rotation and alignment of the bikes in a near side/far side fashion as well. The robotic arm is mounted on vertical linear bearings and can be driven to allow loading onto the overhead conveyors at multiple levels. The use of the robotic arm allows for using basement areas or upper levels for storage.

In one exemplary embodiment, the torque arm 3.03 provides a 270-degree rotation about the vertical axis. This allows the entire robotic arm 3 to rotate about the vertical axis, in order to place the bicycle at a desired location on the conveyor belt, without the arm interfering with the rails 3.12. The upper adapter arm 3.06 may rotate 180 degrees about an axis in the horizontal plane going through the joint coupling the upper adapter arm 3.06 to the torque arm 3.03. The lower adapter arm 3.07 may rotate 230 degrees about an axis in the horizontal plane that goes through the joint connecting the lower and the upper adapter arms. Thus in this embodiment, both the upper and lower adapter arms, move in vertical plane by rotating about their respective horizontal axes. The torque arm 3.03 moves the combination of the upper and lower adapter arms as well as the gripper 3.09, about a vertical axis, thus sweeping a horizontal plane if the arm is extended. The gripper 3.09 is connected to the lower adapter arm 3.07 through the wrist element 3.08 that provides a 180-degree rotation about both vertical and horizontal axes passing through the joint 3.08.

In the embodiments shown, the bicycle is suspending vertically after it is placed in the loading station. It is desirable that the bicycle maintains its vertically hanging position throughout its transport to the conveyor belts. Depending on the size of the elevator chamber, a swinging or tilted bicycle may hit the other bicycles that are already stored on the conveyor belts. Maintaining the hook, and therefore the bicycle that is hanging from it, perpendicular to the horizontal plane, prevents the bicycle from swinging or tilting from its vertically hanging position. Therefore, in the embodiment shown, the element 3.09 that grabs onto and holds the hook is not rotated in the vertical plane. The wrist motion of the joint 3.08 compensates for any deviation of the gripper 3.09 from the horizontal that may be caused by the motion of the upper and lower adapter arms 3.06, 3.07

Figure 5:
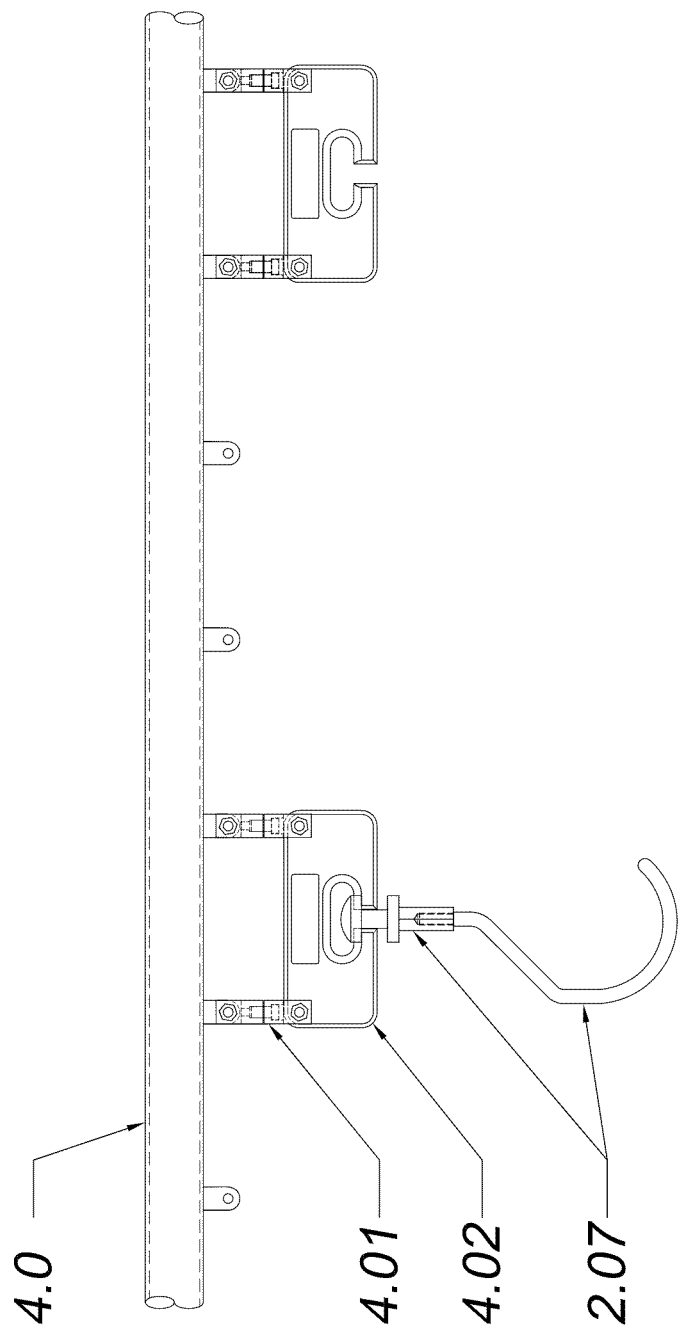
FIG. 5 shows an overhead conveyor, according to aspects of the present invention.

FIG. 5 shows an overhead conveyor, according to aspects of the present invention.

One exemplary configuration of the overhead carrier or conveyor 4 of FIG. 1 and FIG. 2A is shown in FIG. 5. The overhead conveyor includes a pivoting connector 4.01 and a spreader bar 4.02.

The bicycles are stored along the overhead conveyors. The hook 2.07, from which the bicycle would be hanging, is placed in the opening of the spreader bar 4.02 and is secured to the overhead conveyor 4.0 through the pivoting connector 4.01.

FIG. 6A and FIG. 6B show a flowchart of an exemplary method of operation, according to aspects of the present invention.

The flowchart of this drawing shows one exemplary method of operating the system that is shown in FIG. 1. Each user of the system has an identification means such as a security card or an access card that identifies the user and may be read by a card reader. The card reader is either integrated into the system or is coupled to the system. The card reader has a tamper proof cover that opens to provide access to the card reader and is capable of closing to a user to cut off access by the user. The bicycle that is being stored has identification means such as a RFID tag and/or bar codes attached to it. Several levels of conveyors may be used, as shown in FIG. 2A. The user may be a bike share or a public parking user. A bike share user may use any of the stored bicycles or at least a subset of the stored bicycles that fit his height and weight. A public parking user, who is not registered for a bike share program, is entitled to the use of his own bicycle alone.

The method begins at 600.

At 601, access to the access control panel is initiated by holding the access card in close proximity of the panel. An appropriate authorizing technology, such as RFID, recognizes the card and opens the weather and tamper proof cover allowing further access to the holder of the security card. Inserting the card and entry of a confirming PIN, opens the exterior door of the loading station. At this point, fraudulent or stolen cards are secured within the machine and the tamper proof cover closes. Data stored on the access card may provide the ID, type, length, weight, and ownership of the bicycle and billing information of the owner.

At 602, the exterior door of the system opens to permit the user access to the storage space. With the exterior door open, the operator will roll the bike into the load and unload chamber and sweeps the front wheel over the hook. In the exemplary embodiment shown in FIG. 1 and FIG. 2A, the bike is rolled into chamber in an upright position and on its rear wheels. Responding to a sensing of the front wheel, the load hoist begins to rise vertically until the bike's rear wheel is lifted off the ground.

At 603, once the load of the bike is on the hook, a load cell in the load hoist confirms that the weight limit has not been exceeded. The weight limit of the bike may be set to 25 kg or 50 kg for example, to accommodate a wide variety of two-wheeled or three-wheeled vehicles. Overweight bikes are prompted for removal at this time. Scanners and sensors may be used to prevent the door from closing with someone inside or blocking the exterior door.

At 604, the exterior door closes and the RFID and bar code tags on the bicycle are read. Bicycle registration is confirmed and digital images of the bike are obtained for security system processing.

At 605, with the exterior door closed and the above processes complete, the interior door opens. The robotic arm and gripper extend to the load hoist to grasp the bike hook and the user's bicycle.

At 606, the orientation of the handlebars, in the near side/far side (NS/FS) position, is arranged for by a rotation of the load hoist. This rotation is performed together with the scanning process, allowing for scanning of the bike on all sides. In addition, the NS/FS orientation allows for higher density storage of the bikes when they are placed upon the overhead conveyors. The NS/FS positioning is shown in FIG. 1, where the handlebars of every other bicycle are aligned. With every two adjacent bicycles the handle bar of one is adjacent to the wheel of the other.

The rotation may be performed by the rotation of the load hoist while the bicycle is in the load-unload chamber of the loading station or by the robotic arm inside a chamber of the robotic elevator, or during the removal of the bicycle from the loading station by the robotic arm. In the embodiment shown in the following FIG. 7A, the rotation occurs within the loading station.

At 607, the robotic arm retracts into the robotic elevator's chamber and the interior door closes.

At 608 moving vertically up or down to the designated conveyor, the robotic arm can select from multiple pick and place points on each conveyor. This allows for the cycle times to be kept low. For example, in one arrangement, each cycle may be kept as low as 35 seconds. During a cycle time, a bicycle is stored and the system is ready for storing the next bicycle.

As explained further below, the multiple pick and place points are obtained by the arrangement of the relationship between the serpentine configuration of the conveyor and the robotic elevator and would depend also on the number of the robotic elevators used for a storage area At 609, the robotic arm extends out to place the bike hook and bike onto the conveyor. Attached to the conveyor is the spreader, which allows for placement of the bike hook from both sides and secures it with a groove that prevents the bike hook from slipping off of the spreader.

At 610, computer controls monitor placement of the bikes, storage of digital images, bike registration, queuing and time and date stamping for the operation of the bike parking system.

At 611, during peak periods of high use, the computer controls and programming allow the system to rapidly place bikes onto the nearest points of the conveyor with sorting and queuing to be performed during off peak times. Queuing can be performed so that a linear time based sequence can reduce the cycle times for public parking. Bike shares may use a size and model queuing criteria.

At 612, the method ends.

The steps 610 and 611 that include bookkeeping and house-cleaning actions may be performed at any time and are not limited to the order shown.

Retrieval of the bicycle is done in an opposite order with bikes removed from the conveyor and placed onto the load hoist. The exterior door opens and the user removes the bike. Data stored in the card will determine if the person is a bike share or public parking user. In addition, the system's sophistication can determine in advance if the user is picking up or dropping off at the initial swipe of the security card.

FIG. 7A shows a storyboard showing stages of a user accessing a loading station of a storage system, according to the aspects of the present invention, and loading a bicycle into the loading station. FIG. 7B shows a storyboard showing stages of a storage system, according to the aspects of the present invention, carrying a bicycle from a loading station and storing the bicycle on conveyor belts in a storage area.

The storyboards shown in FIG. 7A and FIG. 7B provide one visual depiction of some of the steps discussed above in the context of FIG. 6A and FIG. 6B.

In FIG. 7B, the conveyor belts are shown with empty hooks hanging. This depiction pertains to an alternative embodiment where either the hook is not removed from the loading station. According to an alternate embodiment, the bicycle may be handed from one hook to another at the conveyor belt.

In the embodiments shown above, the conveyor belts at different levels of storage are not continuous and a transport of the bicycle from one level to another is achieved through the elevator. In alternative embodiments, the conveyor belt may be continuous across several levels of storage. In such embodiments, inclined stretches of conveyor belts may convey the bicycles from one level to another level.

Figure 8:
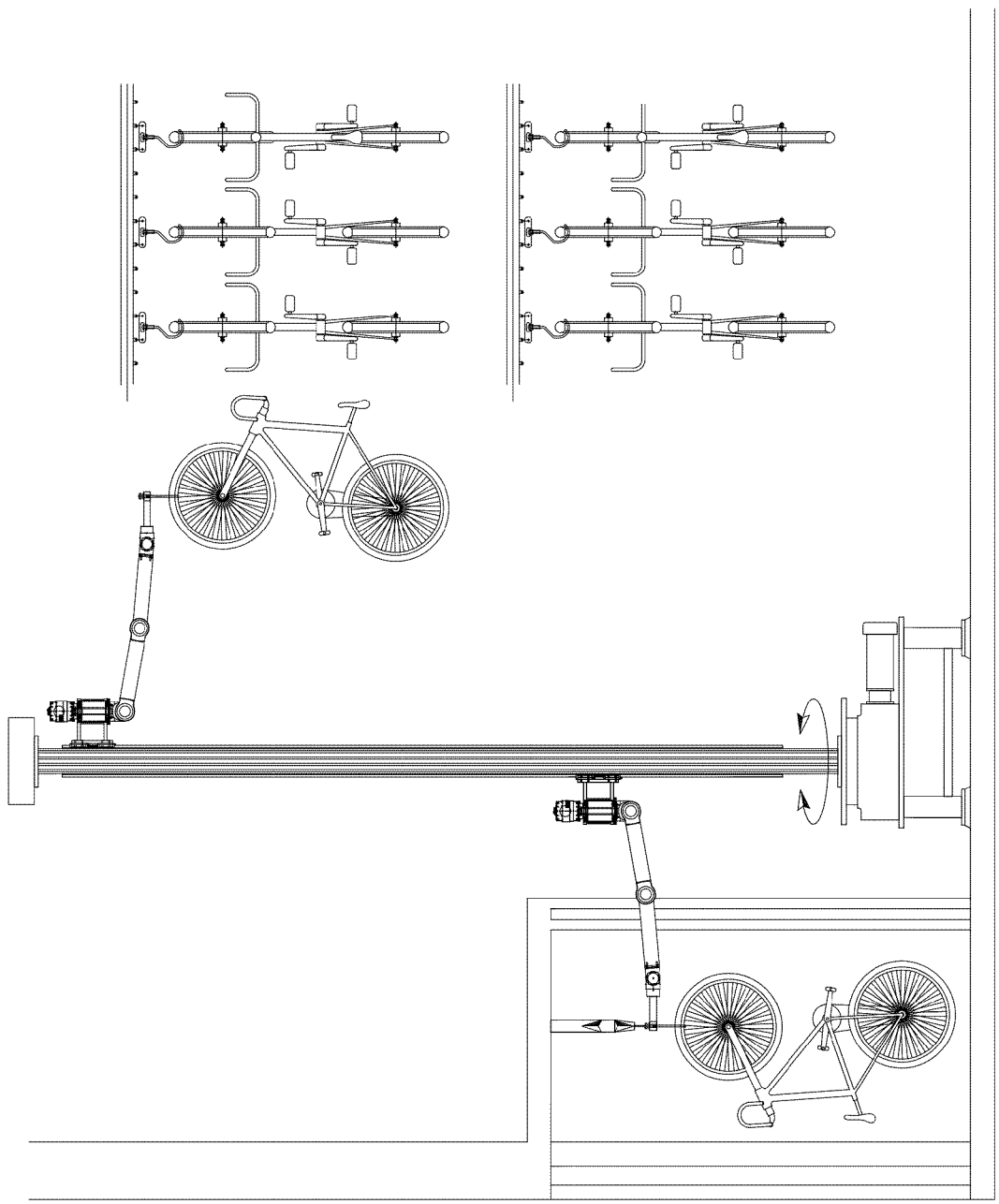
FIG. 8 shows a double robotic arm elevator, according to aspects of the present invention.

FIG. 8 shows a double robotic arm elevator, according to aspects of the present invention.

For higher use sites, a double robotic arm (DRA) elevator system may be engineered with shorter cycle times. One exemplary arrangement of a DRA elevator is shown in FIG. 8. To meet the needs of peak use at high volume and high turnover locations, the DRA elevator is more suitable. To arrive at the DRA elevator shown in FIG. 8, a second robotic arm may be added to the robotic elevator of FIG. 2A. This additional robotic arm is mounted on an opposite side of the vertical column on which the first robotic arm is mounted. With two independent drives and a rotary turntable axis that allows for 180 degrees of rotation, the DRA elevator can reduce the loading cycle times. For example, a loading cycle that lasts 35 seconds with one robotic arm may be conducted in 17 seconds when two robotic arms are used. With the DRA elevator, one robotic arm is used for retrieval of the bike from the loading station while the second one is used for storing a second bike.

Incorporating multiple DRA elevators into a high volume location, such as a train station, would solve bike-parking issues when the available space has been expanded into overflow areas. When multiple DRA elevators are coupled with multiple conveyors, commuters who ride bikes to train stations could park their bike securely and in a smaller space by eliminating the isle ways that are used for access to the traditional locking bike racks.

Figure 9:
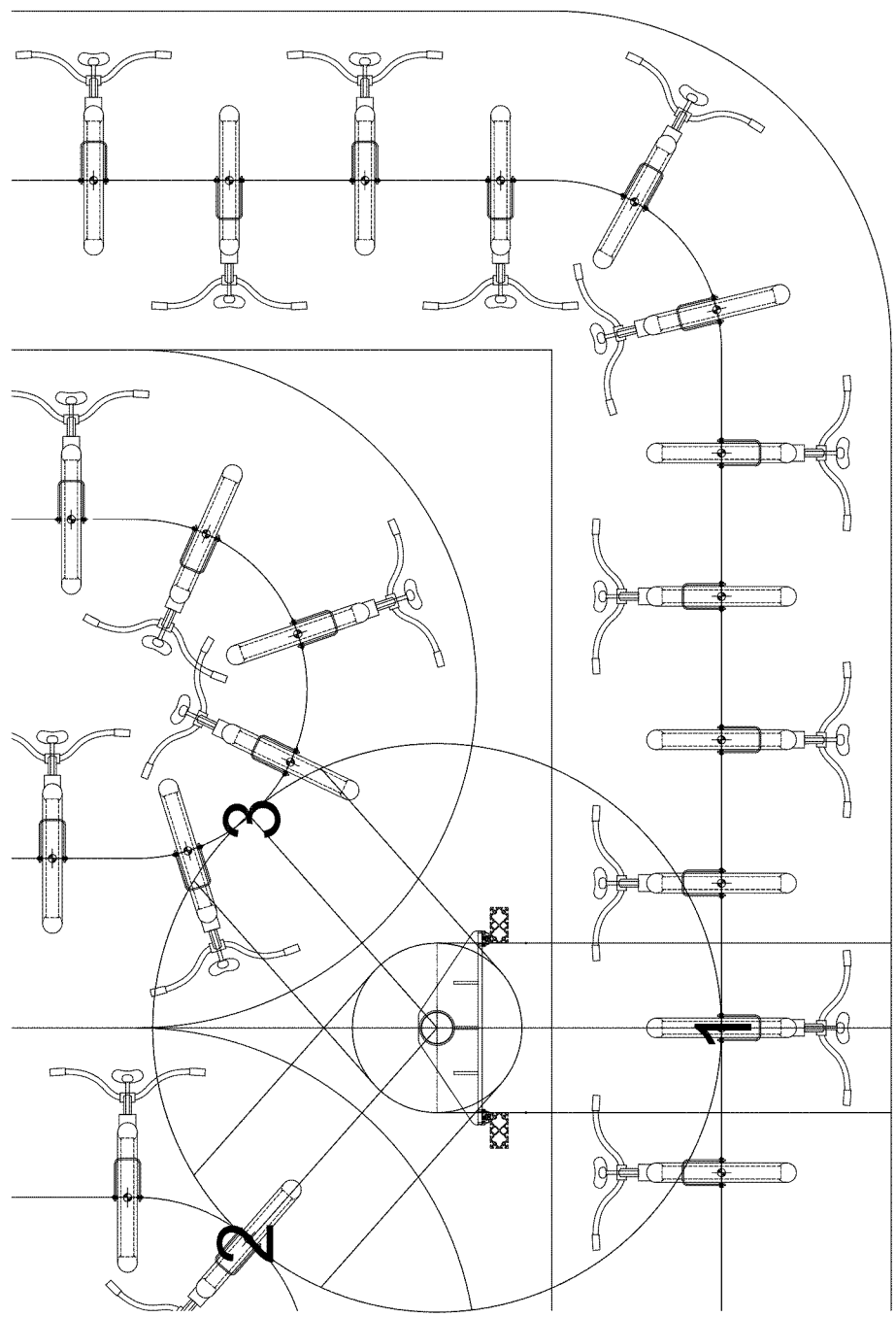
FIG. 9 shows another view of an overhead conveyor system, according to aspects of the present invention.

FIG. 9 shows another view of an overhead conveyor system, according to aspects of the present invention.

FIG. 9 shows one alternative where the serpentine arrangement of the conveyor provides the elevator with three points of access. This drawing shows how the robotic elevator can load a conveyor at three different points shown as 1, 2 and 3 on the drawing. At high volume locations, where storage cycle times are critical, forward/reverse and multi-point loading allows for fast access.

As discussed above, the robotic elevator may be configured to access multiple elevations. Therefore, the conveyors may be located on various levels, above or below the bike entry level that is usually at the street level. Further, the serpentine layout of the conveyor may expand to fit spaces of all shapes and sizes. In an area where children's bikes are more prevalent, such as near schools, some levels of conveyor belts may be established for smaller bikes and assign less than a full-height space for use.

In one exemplary arrangement, an area that is 30 ft×40 ft for a total of 1200 sqft is capable of fitting a single level serpentine conveyor that is 270 ft long. If the bikes are stored at 2 ft of spacing, then the conveyor belt would fit 135 bikes. The storage area of 1200 sqft divided by 135 bikes yields 8.89 sqft for each bike if a single level conveyor is installed in this storage space or 4.45 sqft for each bike in a double level configuration. Using 3 loading points for each elevator arm together with enabling the conveyor to travel both in forward and reverse, which reduces the travel distance of each bike in half, results in reducing the loading and unloading travel distance to $(1/6)^{th}$ of the travel distance without such provisions. A worst-case scenario for indexing the conveyor at $(1/6)^{th}$ of the distance, corresponds to a distance of approximately 22 bikes between the elevator arm and the farthest bike on the belt. This distance corresponds to a 60 s cycle for loading or unloading each bicycle. Queuing reduces this figure by 50%.

Figure 10:
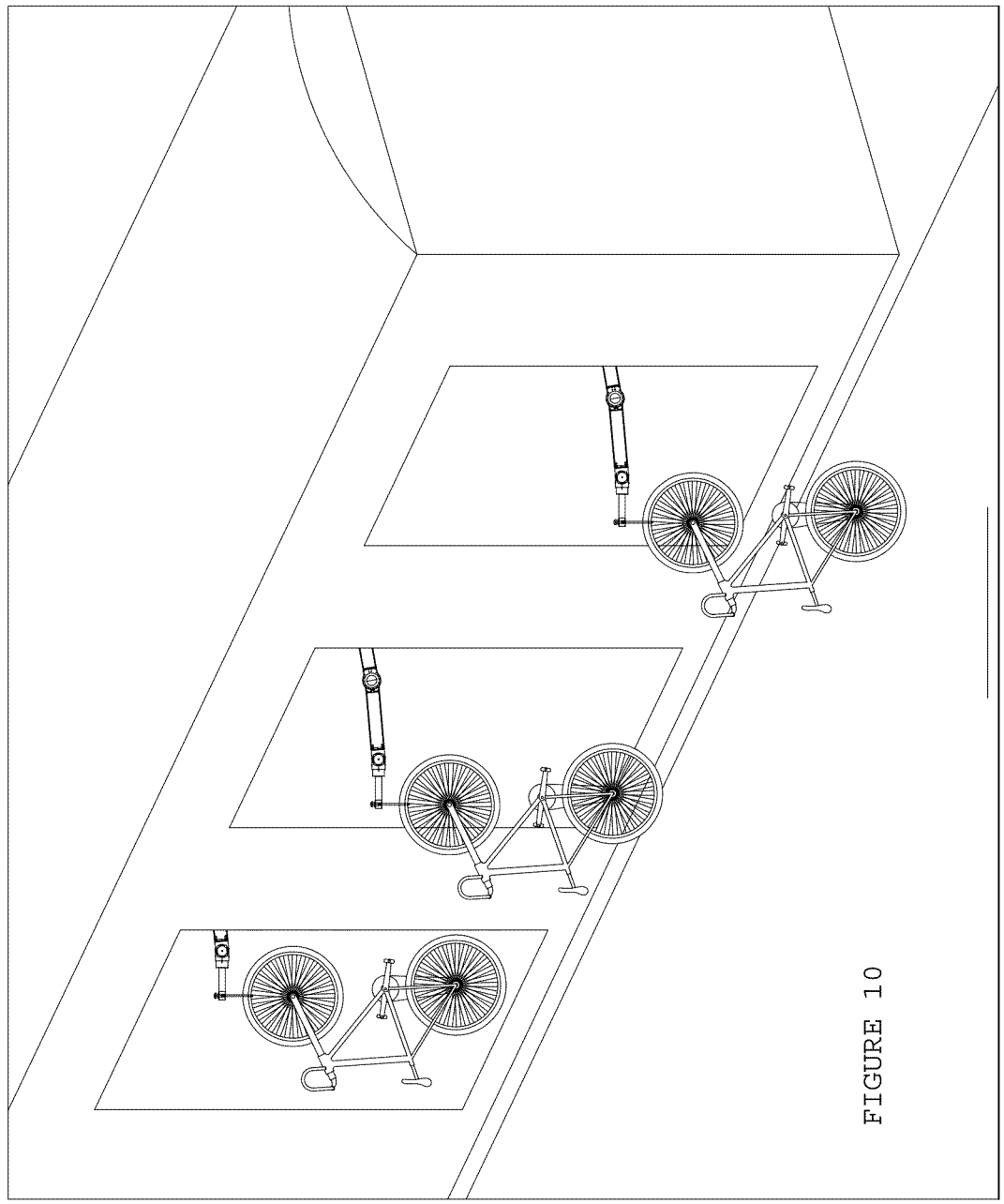
FIG. 10 shows a view of entry to a storage system implemented on a train, according to aspects of the present invention.

FIG. 10 shows a view of entry to a storage system implemented on a train, according to aspects of the present invention.

This drawing shows an implementation of the storage system of the aspects of the present invention in a train car. This implementation allows for travelers to take their bikes with them onto the trains.

Figure 11:
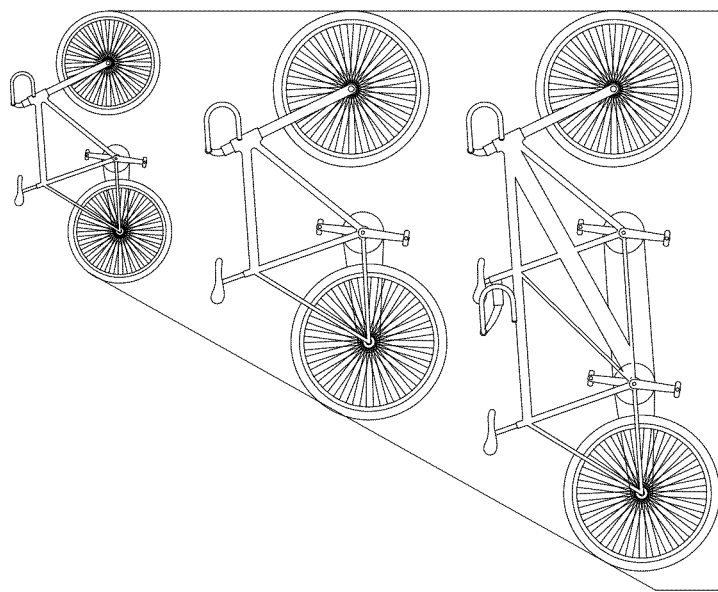
FIG. 11 shows a variety of bicycles and other devices that may be stored in a storage system, according to aspects of the present invention.

FIG. 11 shows a variety of bicycles and other transportation devices that may be stored in a storage system, according to aspects of the present invention.

The systems and methods provided above are applicable to bicycle-like vehicles such as strollers, wheel chairs and front loader bikes. In various aspects of the present invention, the types of bikes that may be parked in the storage system of the invention range from a child bike to an adult bike including tandem bikes. Three-wheel (freight) bikes, wheelchairs and hand-cranked bikes, which are used by the disabled, can also be parked in the storage system of the aspects of the present invention. Overall length of the bikes establishes the vertical spacing of the conveyors. Therefore, bike variety and available space would be a factor when configuring the layout of the conveyors.

One exemplary set of specification for the bikes that could be stored in the storage system of the aspects of the present invention includes a weight limit of 25 kg or 55 lbs an overall length varying between a minimum of 915 mm or 36 inches and a maximum of 2743 mm or 108 inches and a maximum width limit of 760 mm or 30 inches.

One exemplary set of design options includes operation on renewable DC electricity, access for the disabled and storage capability for hand crank bikes and wheelchairs, DC-electricity driven bike share units, automatic recharging of the bike share units, high level security screening including bomb sniffing capabilities, GPS enabled bike shares, CDMA GPS/cellular triangulation system (CTS), and emergency repair service beacon.

Operational software that is used with various implementations of the aspects of the present invention may include RFID technology for access control and as primary means for bicycle identification. To ensure that the access control panel remains secure and weather proof, RFID tags may be added to the access cards to provide a non-contact access method. The RFID tags also allow the controls to initiate a search for the customer and bike ID before the second phase of card swipe and PIN verification is performed. Data stored on the card combined with the network's memory allows for a time and date based historical algorithm to control the queuing process. Customers who ride a train at the same time every day would have their bikes arranged into segments of the conveyor that would match the train's scheduled departure and arrival times. Regular commuters and local users may obtain access cards with online subscription to the service. Additionally, point of sale kiosks would also dispense cards for the daily use of the tourists. The network may be expanded to several cities and may allow travelers between those cities unlimited access to the bike share and the public storage and parking system. An option may be provided for the user to make reservations via the Internet or cellular phone or other means of communication. The bike share units, which are the bicycles used for the bike share program, may be tracked using the CDMA GPS/cellular triangulation system (CTS). Tracking the bikes permits the headquarter of the storage facility to view the real time location of the shared bicycles. Therefore, when bike shares are clustering at popular destinations or the quantities are low in certain popular pick up sites, units can be shuttled from one site to another site. Tracking the bikes also allows for tracing lost or stolen bikes. Combining this technology with an emergency beacon enables the operators to summon help for bike repairs or accidents.

Figure 12:
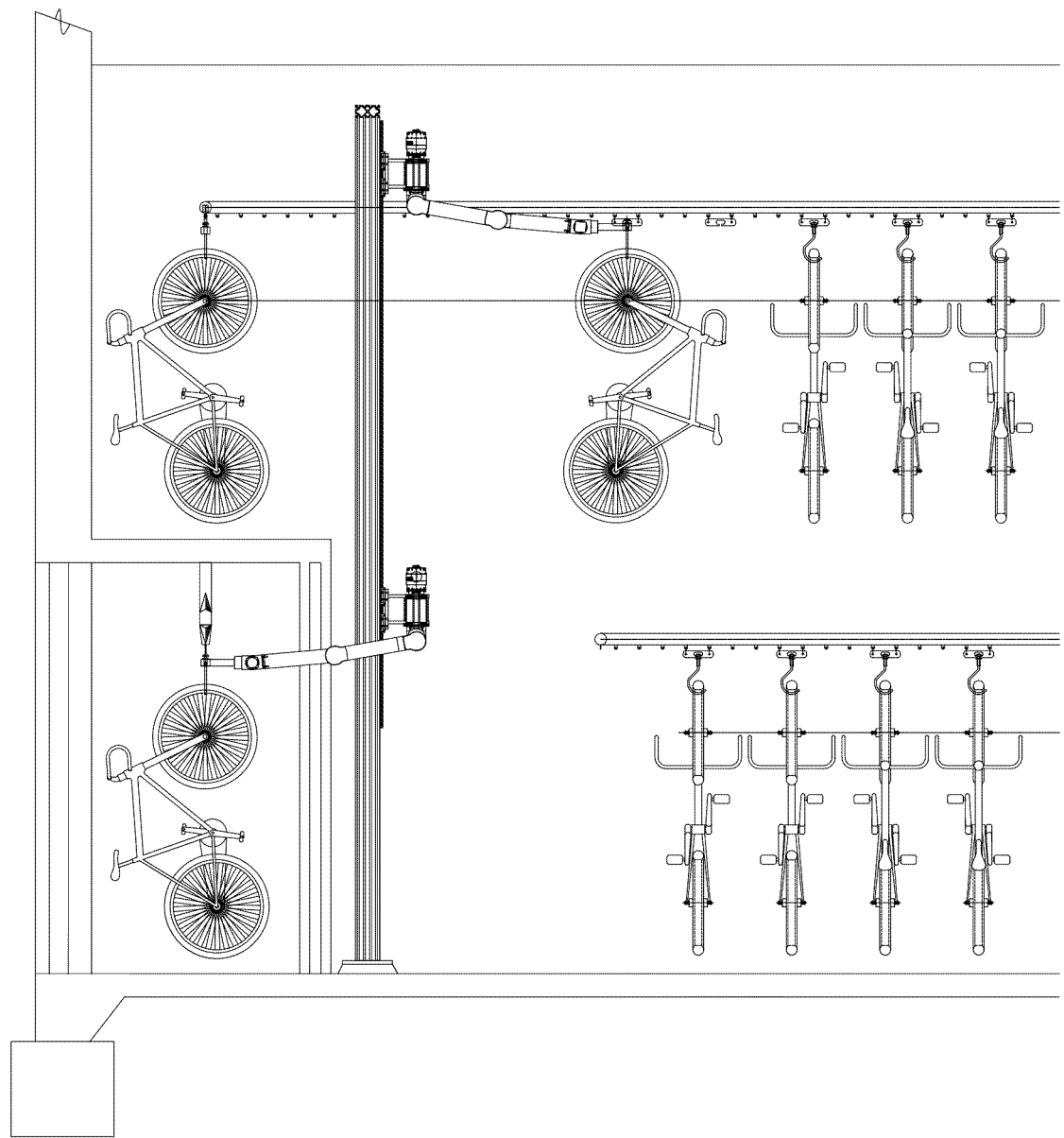
FIG. 12 shows another overview of the storage system, according to aspects of the present invention.

FIG. 12 shows another overview of the storage system, according to aspects of the present invention.

A two-level storage system is depicted in this drawing where the bicycles are stored at both levels and the loading station or the entry is provided from the lower level. The robotic arm grasps the hook with the suspended bicycle, pulls or rotates the bicycle inside and lifts it to the second level if the programming so instructs. While FIG. 1 showed a two-level storage system as well, both levels were located below the entry level. FIG. 1 corresponds to a situation where, for example, the street level is crowded and all storage has to occur at basement levels. In FIG. 2A, storage is performed at the street level as well.

Figure 13:
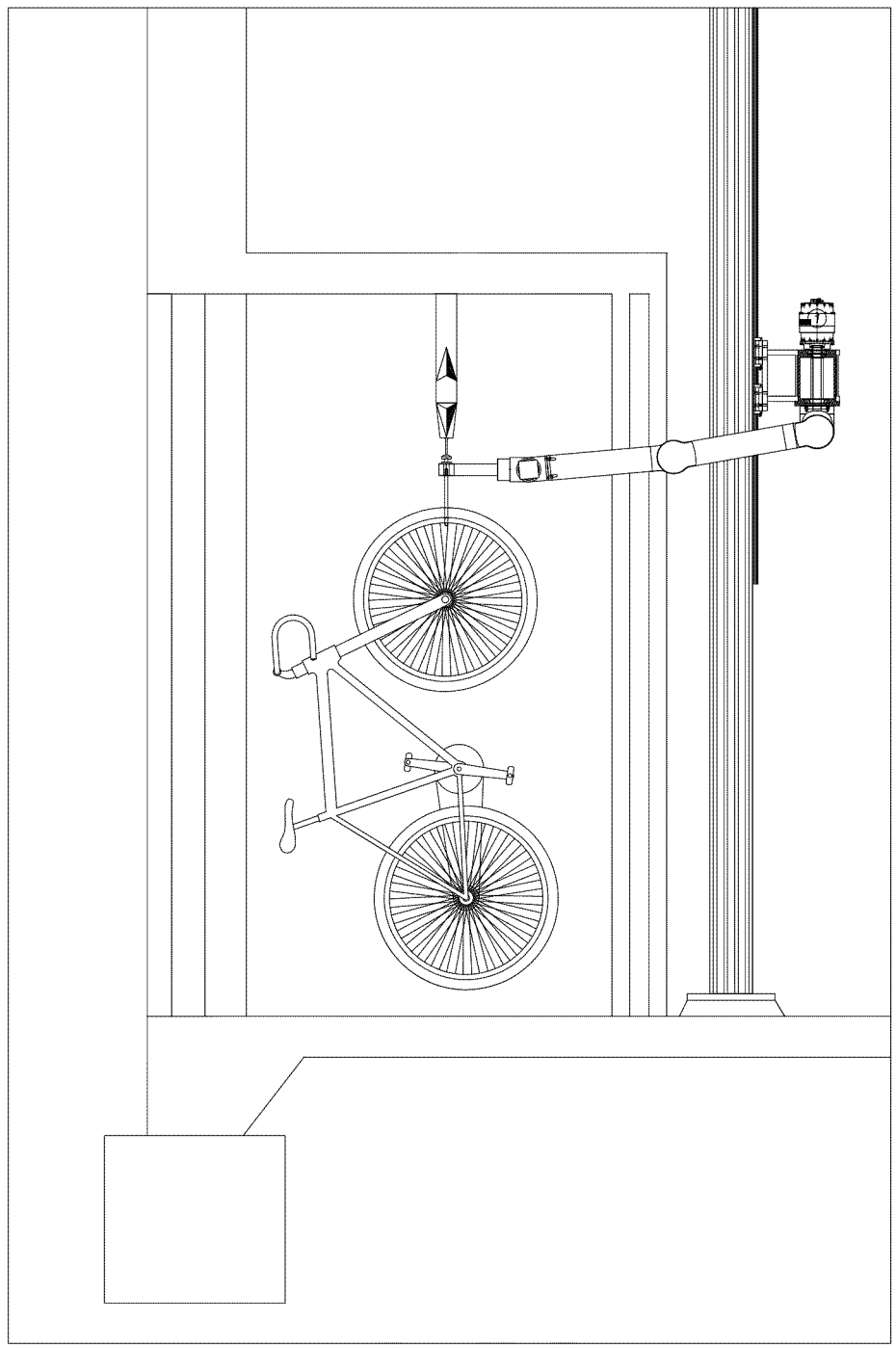
FIG. 13 shows another view of the robotic arm of the robotic elevator of the storage system, according to aspects of the present invention.

FIG. 13 shows another view of the robotic arm of the robotic elevator of the storage system, according to aspects of the present invention.

A closer view of the robotic elevator and the associated robotic arm of FIG. 12 is shown in FIG. 13.

Figure 14:
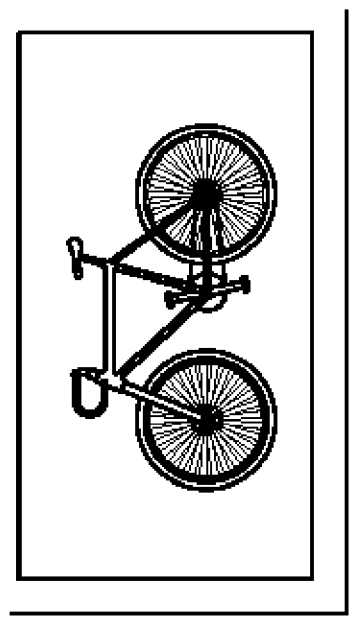
FIG. 14 shows a bicycle design, according to the aspects of the present invention, for being stored in the storage system of the aspects of the present invention.

FIG. 14 shows a bicycle design, according to the aspects of the present invention, for being stored in the storage system of the aspects of the present invention.

The exemplary bicycle shown in FIG. 14 has features including three speed drive, front suspension, seat post shock absorber, front and rear fenders, chain guard, front storage basket, rear carriage rack, lithium-ion battery pack, 500 W regenerative DC electric drive train, CDMA GPS/Cellular Triangulation System, RFID and barcode tags, front headlight, rear taillight, GPS with programmed bike share locations, wireless cell phone interface for GPS and emergency and repair signaling.

Figure 15A:
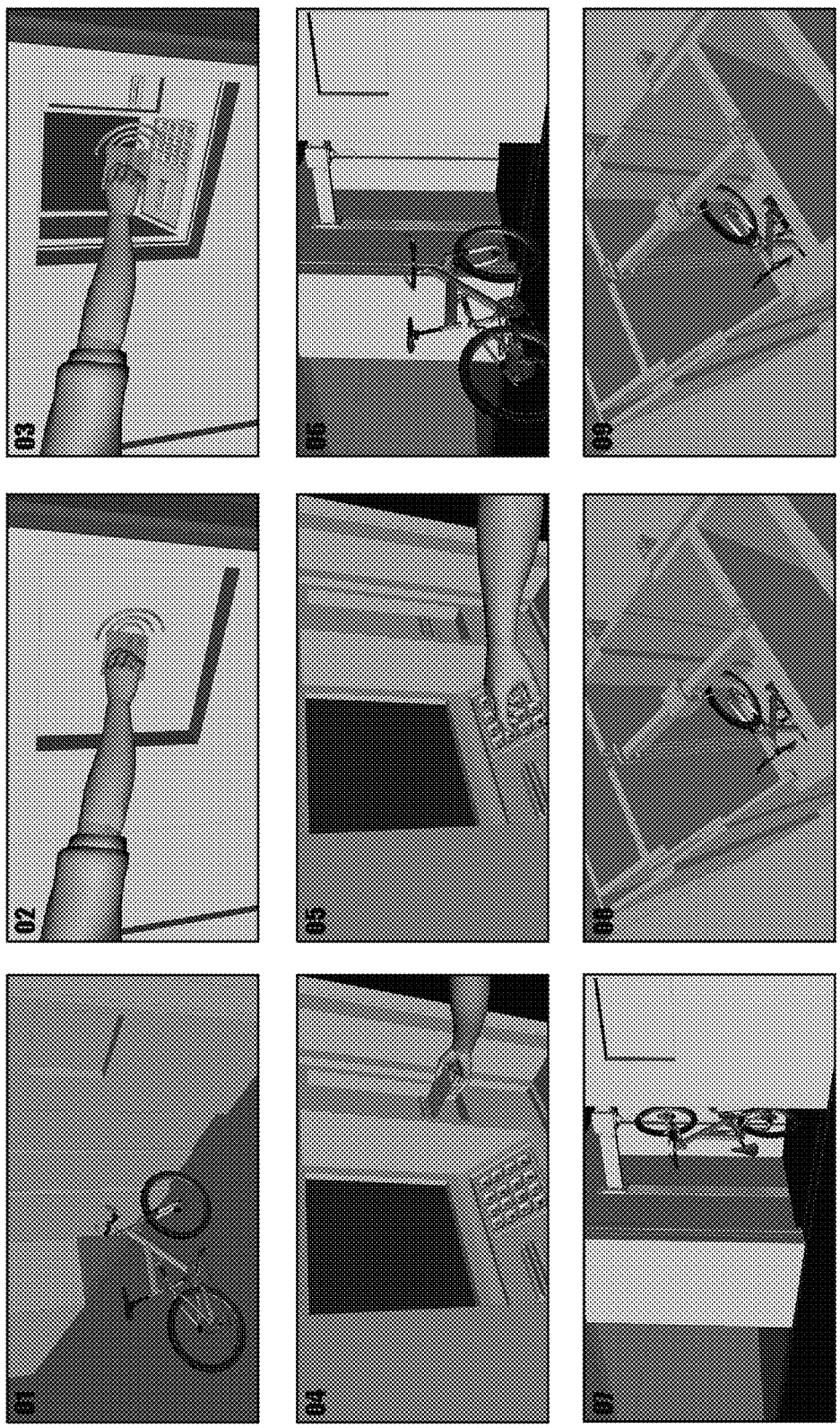
FIGS. 15A and 15B shows a storyboard showing stages of a storage system, according to the aspects of the present invention, carrying a bicycle from a loading station and storing the bicycle on conveyor belts in a storage area.
Figure 15B:
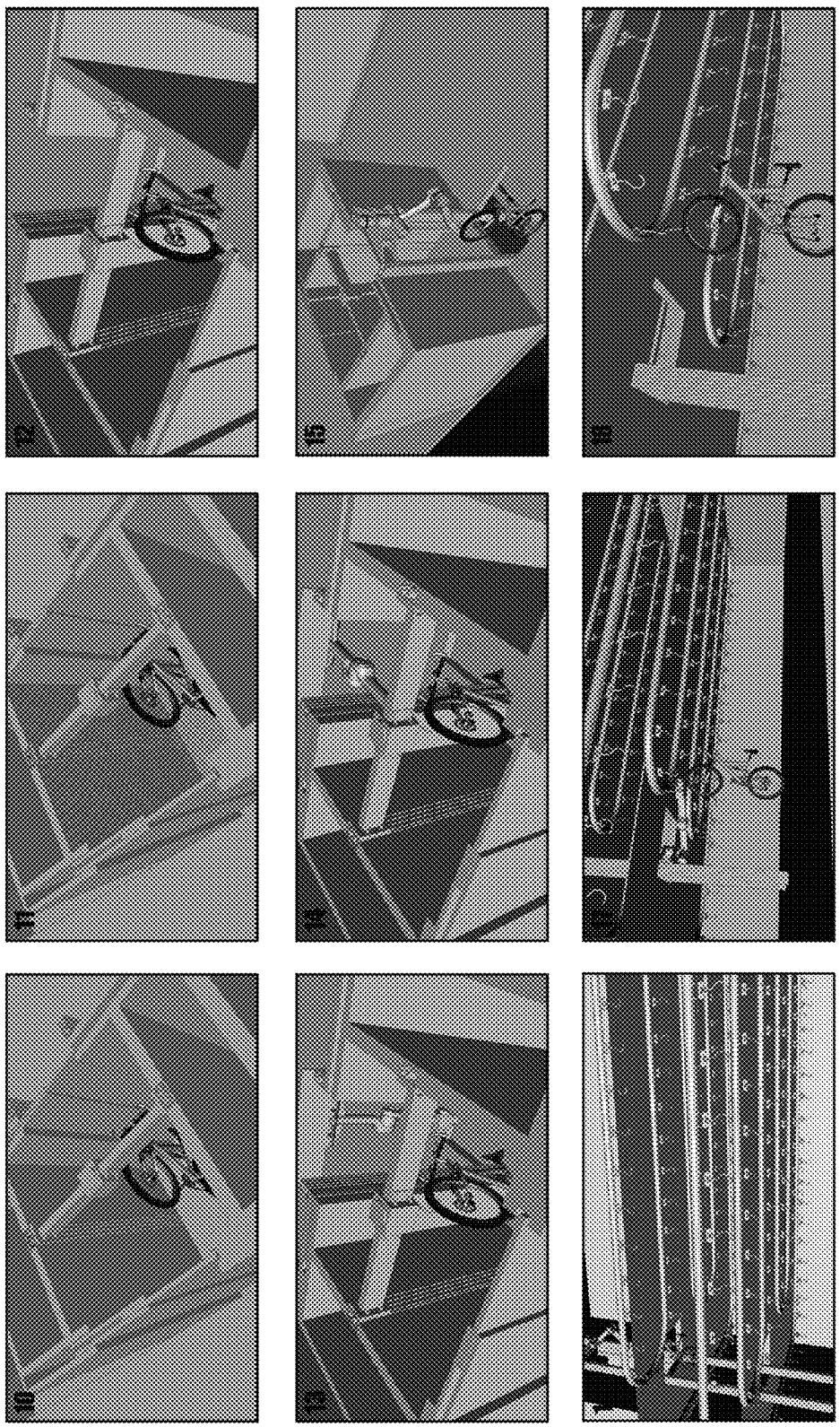

FIGS. 15A and 15B depict the system for storing and retrieving bicycles according to the present invention.

The present invention has been described in relation to particular examples, which are intended to be illustrative rather than restrictive, with the scope and spirit of the invention being indicated by the following claims and their equivalents.

The invention claimed is:

1. A system for public storage of bicycles, the system comprising:
   a control access panel for authorizing a user to access the system;
   a loading station for receiving a bicycle from the user;
   a robotic elevator for lowering or raising the bicycle to a storage area;
   a conveyor for receiving the bicycle from the robotic elevator; and
   computer controls for identifying and registering the bicycle, wherein the robotic elevator is adapted to rotate the bicycle 180 degrees about a vertical axis.

2. The system of claim 1, wherein the control access panel identifies and authorizes the user in response to receiving an access card or a radio frequency identification tag from the user.

3. The system of claim 1, wherein the control access panel blocks access to the control access panel in response to an attempt for access by an unauthorized user.

4. The system of claim 1, wherein the loading station comprises:
   an exterior door for receiving the bicycle from the user;
   a hook for carrying the bicycle;
   a header coupled to the hook for holding the hook in place; and
   a loader hoist coupled to the header, the loader hoist for raising the bicycle from a floor of the loading station and holding the bicycle in a suspended position.

5. The system of claim 4, wherein the hook is removable and remains with the bicycle throughout storage.

6. The system of claim 5, wherein the robotic elevator comprises:
   a robotic arm including:
      a gripper adapted for being coupled to the hook,
      a multi-axis wrist element adapted for being coupled to the hook through the gripper,
      a lower adapter arm coupled to the multi-axis wrist element, and
      an upper adapter arm coupled to the lower adapter arm;
   a linear bearing rail and a linear bearing adapted for moving along the linear bearing rail, the linear bearing coupled to the robotic arm at the upper adapter arm;
   a carriage coupled to the linear bearing and to the robotic arm at the upper adapter arm; and
   a DC gear-motor for moving the upper adapter arm.

7. The system of claim 6, wherein the linear bearing rail is located along a vertical direction to the ground.

8. The system of claim 1, wherein the robotic elevator further comprises a further robotic arm in addition to the robotic arm.

9. The system of claim 8, wherein while the robotic arm is lowering the bicycle from the loading station to the storage area the further robotic arm is raising a further bicycle from the storage area to the loading station.

10. The system of claim 1,
   wherein the storage area comprises one or more levels of storage, and
   wherein at each level of storage, the conveyor is configured in a serpentine configuration.

11. The system of claim 5, wherein the conveyor comprises:
   a conveyor bar;
   a spreader bar adapted for being coupled to the hook; and
   a pivoting connector coupled between the conveyor bar and the spreader bar.

12. The system of claim 1,
   wherein the computer controls comprise circuitry and programming adapted for monitoring placement of the bicycle, obtaining and storing digital images of the bicycle, registration of the bicycle, and providing queuing and time and date stamps for the operation of the system.

13. The system of claim 1,
   wherein the computer controls comprise circuitry and programming adapted for programming the system to place bicycles onto nearest points of the conveyor with sorting and queuing to be performed during off peak times,
   wherein the queuing is performed so that a linear time based sequence reduces the cycle times for public parking, and
   wherein bicycle shares may use a size and model queuing criteria.

14. An automatic method for public storage of bicycles at a public storage system having a loading station for receiving the bicycles, a robotic elevator for raising or lowering the bicycles to a storage area and for placing the bicycles on conveyors in the storage area and computer controls for identifying and registering the bicycle, the method comprising:
   receiving identification information of a user at an access control panel for providing access to the loading station;
   providing access to the loading station by opening an exterior door of the loading station;
   closing the exterior door after receiving of a bicycle from the user;
   identifying the bicycle by reading and processing identification insignia of the bicycle;
   opening an interior door providing a passage between the loading station and the storage area;
   grasping the bicycle by a robotic arm of the robotic elevator;
   moving the bicycle toward the storage area;
   lifting or lowering the bicycle to a designated place on the conveyors; and
   securing the bicycle to the conveyors in the storage area.

15. The method of claim 14, further comprising:
   verifying that the bicycle does not exceed a weight limit; and
   identifying heavy bicycles for removal.

16. The method of claim 14, wherein the moving of the bicycle toward the storage area includes:

retracting the bicycle into an elevator chamber portion of the storage area, or rotating the bicycle into the elevator chamber.

17. The method of claim 14, further comprising:
procuring and storing a digital image of the bicycle after receiving the bicycle from the user.

18. The method of claim 14, further comprising:
receiving an access card of the user at the access control panel,
wherein data stored on the access card includes identification, type, length, weight, and ownership of the bicycle and billing information of the user.

19. The method of claim 14, wherein with the exterior door open, the user rolls the bicycle in an upright position and on its rear wheels into a load and unload chamber of the loading station and sweeps a front wheel over a hook provided in the load and unload chamber, wherein the hook is removably coupled to a load hoist, the method further comprising:
raising the load hoist vertically, responsive to a sensing of the front wheel, until rear wheel of the bicycle is lifted off the ground.

20. The method of claim 19, further comprising:
rotating the load hoist by 180 degrees to achieve an orientation of handlebars of the bicycles in a near side/far side position on the conveyors,
wherein in the near side/far side position the handlebars of every other bicycle are aligned, and with every two adjacent bicycles on the conveyors the handle bar of one is adjacent to the front wheel of the other.

21. The method of claim 14, further comprising;
utilizing scanners and sensors to prevent the exterior door from closing with the user inside or blocking the exterior door.

22. The method of claim 14,
wherein the bicycle is connected to a hook in the loading station,
wherein the conveyors include a spreader adapted to receive the hook from both sides and secure the hook with a groove preventing the hook from slipping off, and
wherein the securing of the bicycle to the conveyors in the storage area includes:
aligning the bicycles; and
extending the robotic arm to place and secure the hook into the spreader.

23. The method of claim 14, further comprising:
placing the bicycles onto nearest points of the conveyors to the robotic elevator;
performing sorting and queuing during off peak times; and
monitoring placement of the bicycles, storage of digital images of the bicycles, bicycle registrations, and time and date stamps for the operation of the public storage system by the computer controls.

24. The method of claim 14,
wherein the storage area comprises one or more levels of storage, and wherein at each level of storage, the conveyors are configured in a serpentine configuration.

* * * * *